United States Patent
Hopley

(10) Patent No.: US 6,546,913 B2
(45) Date of Patent: Apr. 15, 2003

(54) PRESSURE REGULATOR

(75) Inventor: Daniel Jeremy Hopley, Gillingham (GB)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/957,721

(22) Filed: Sep. 21, 2001

(65) Prior Publication Data

US 2002/0035985 A1 Mar. 28, 2002

(30) Foreign Application Priority Data

Sep. 22, 2000 (GB) .............................. 0023242

(51) Int. Cl.[7] .............................................. F02M 41/00
(52) U.S. Cl. ...................................... 123/457; 123/502
(58) Field of Search ................................ 123/457, 502, 123/514, 300, 450; 137/529, 514.3; 417/221

(56) References Cited

U.S. PATENT DOCUMENTS

| 3,207,140 A | * | 9/1965 | Roosa | 123/502 |
| 3,314,406 A | * | 4/1967 | Kemp et al. | 123/502 |
| 4,064,906 A | | 12/1977 | Berg | 137/529 |
| 4,178,137 A | | 12/1979 | Brotherston | 417/294 |
| 4,282,843 A | | 8/1981 | Seilly et al. | 123/450 |
| 4,393,844 A | | 7/1983 | Skinner | 123/450 |
| 4,419,054 A | * | 12/1983 | Sosnowski et al. | 417/294 |
| 4,421,084 A | | 12/1983 | Broadwith et al. | 123/365 |
| 4,455,126 A | | 6/1984 | Brotherston | 417/252 |
| 4,508,489 A | * | 4/1985 | Howes | 417/221 |
| 4,531,488 A | * | 7/1985 | Kawamura et al. | 123/300 |
| 4,573,444 A | * | 3/1986 | Howes | 123/502 |
| 4,625,701 A | * | 12/1986 | Bartlett et al. | 123/514 |
| 5,050,637 A | * | 9/1991 | Sagawa | 137/529 |
| 5,577,533 A | * | 11/1996 | Cook, Jr. | 137/514.3 |
| 6,125,822 A | * | 10/2000 | Janik et al. | 123/457 |

FOREIGN PATENT DOCUMENTS

| CH | 690191 | 5/2000 |
| WO | WO 9930020 | 6/1999 |

\* cited by examiner

*Primary Examiner*—Carl S. Miller
(74) *Attorney, Agent, or Firm*—Thomas N. Twomey

(57) ABSTRACT

A pressure regulator for use in regulating the outlet pressure of a pump for use in an engine comprises a piston member which is moveable with respect to an outlet opening under the influence of fluid pressure acting on the piston member to control the degree by which the outlet opening is obscured. The pressure regulator comprises a biasing arrangement for applying a biasing force to the piston member which opposes the pressure of fluid acting on the piston member. The biasing arrangement comprises a moveable abutment member which is cooperable with a stop member so as to vary the rate at which the displacement of the piston member varies with fluid pressure acting on the piston member. The stop member is pre-set in a fixed position relative to the regulator housing such that movement of the abutment member is terminated when the abutment member is urged into engagement with the stop member. The invention also relates to a transfer pump comprising a pressure regulator.

1 Claim, 3 Drawing Sheets

PRESSURE REGULATOR

FIELD OF THE INVENTION

This invention relates to a pressure regulator suitable for use in regulating the outlet pressure of a low pressure, transfer pump of a fuel system for a compression ignition internal combustion engine.

BACKGROUND OF THE INVENTION

It is known to use, as the transfer pump for use in a fuel system, a vane pump which is arranged to operate at a speed associated with engine speed. The vane pump may be provided with a regulator of the type illustrated in FIG. 1, comprising a sleeve 10 within which a piston member 12 is slidable. The piston member 12 is biased by means of a spring 14 and is moveable under the action of the fuel pressure at the outlet of the transfer pump. When the piston member 12 is in the position shown in FIG. 1, the piston member 12 closes an outlet 16 defined within the sleeve 10 to prevent fuel flowing through the outlet 16 to the inlet side of the transfer pump. The piston member 12 is moveable within the sleeve 10 to a position in which the outlet 16 is open to allow fuel to return to the inlet side of the transfer pump.

The degree to which the outlet 16 is opened depends upon the magnitude of the pressure applied to the piston member 12. By appropriate selection of the size of the piston member 12 and the spring 14, the regulator can be set in such a manner that the outlet pressure of the transfer pump, as regulated by the pressure regulator, is related to the engine and pump speed in a desired manner.

The pressure at the outlet of the transfer pump, as modified by the pressure regulator, is used to control various aspects of fuel system operation. For example, in some arrangements the pressure at the outlet of the transfer pump, as modified by the pressure regulator, is used to adjust the maximum fuelling level of a high pressure fuel pump with which the transfer pump is associated. However, it has been found that setting of such transfer pumps is difficult as the relationship between the outlet pressure and speed varies from pump to pump as a result of production variations.

It is an object of the present invention to remove or alleviate this problem.

By way of background to the present invention, CH 690 191 A5 describes a pressure relief valve for relieving fluid pressure within a load chamber. The pressure relief valve is of the type having a valve needle biased towards a valve seating by means of a spring load. The valve needle is caused to lift away from the valve seating in the event that fluid pressure within the load chamber exceeds a predetermined amount, thereby opening communication between the load chamber and a low pressure drain. The pressure relief valve also includes a piston which is exposed to fluid pressure within a control chamber and which is engageable with a movable piece to alter the spring load acting on the valve needle. By varying fluid pressure within the control chamber, the fluid pressure at which the valve needle is caused to lift from its seating can be varied. The pressure relief valve is of the "plug-in-hole" type in which the valve needle extends into an opening in an insert which defines the valve seating. If fluid pressure within the load chamber is less than the predetermined relief pressure, the pressure relief valve is in a plugged position in which the valve needle extends into the opening and seats against the valve seating to completely close the opening, closing communication between the load chamber and the low pressure drain. If fluid pressure within the load chamber exceeds the predetermined relief pressure, the pressure relief valve is opened and the valve needle lifts off the valve seating to relieve pressure in the load chamber.

SUMMARY OF THE INVENTION AND ADVANTAGES

According to a first aspect of the present invention, there is provided a pressure regulator for use in regulating the outlet pressure of a pump for use in an engine, the pressure regulator comprising a piston member which is moveable within a bore provided in a regulator housing with respect to an outlet opening under the influence of fluid pressure acting on the piston member to control the degree by which the outlet opening is obscured, the pressure regulator comprising a biasing arrangement for applying a biasing force to the piston member which opposes the pressure of fluid acting on the piston member, wherein the biasing arrangement comprises a moveable abutment member which is cooperable with a stop member so as to terminate movement of the abutment member when the abutment member moves into engagement with the stop member, in use, thereby to vary the rate at which the displacement of the piston member varies with fluid pressure acting on the piston member, the stop member having a pre-set fixed position relative to the regulator housing.

Preferably, the biasing arrangement comprises a spring assembly comprising first and second spring means.

Conveniently, the first and second spring means take the form of first and second compression springs.

The regulator housing preferably takes the form of a sleeve. It will be appreciated that the regulator housing may include two or more housing parts secured together, or may be a unitary part.

Preferably, the position of the stop member relative to the regulator housing is adjustable to permit adjustment of a pre-set fluid pressure at which the abutment member is caused to move into engagement with the stop member.

When fluid pressure acting on the piston member exceeds the pre-set fluid pressure, the piston member is moved, against the biasing force due to the biasing arrangement, through a sufficient distance to cause the abutment member to engage the stop member. During this stage of operation, the rate at which displacement of the piston member varies with fluid pressure applied to the piston member is determined by the characteristics of both the first and second spring means. When the moveable abutment member moves into engagement with the stop member movement of the abutment member is terminated, the second spring means is disabled and the rate at which displacement of the piston member varies with fluid pressure is altered. During this stage of operation, the rate at which displacement of the piston member varies with fluid pressure applied to the piston member is determined by the characteristic of only the first spring means.

The predetermined fluid pressure at which the moveable abutment member moves into engagement with the stop member can be adjusted by adjusting the position of the stop member relative to the regulator housing.

When the pressure regulator is used in regulating the outlet pressure of a transfer pump for use in a fuel system, the speed of the associated engine is related to the pressure of fuel acting on the piston member. Hence, by adjusting the position of the stop member, the engine speed at which the moveable abutment member is caused to move into engagement with the stop member can be adjusted. The pressure regulator can therefore be adjusted to give the required transfer pressure-engine speed characteristic.

The invention provides the advantage that, as the pressure-speed characteristic of the pump can be adjusted, pump to pump variations can be compensated for. The pressure-speed characteristic of the pump can also be selected so as to match the requirements of the particular engine.

Preferably, the stop member takes the form of an adjustment screw.

The pressure regulator preferably comprises an adjustment member for adjusting the pre-load of the biasing arrangement. Preferably, the adjustment member takes the form of a further adjustment screw.

Conveniently, at least a part of the stop member extends through a further bore provided in the adjustment member.

The moveable abutment member conveniently includes an annular region defining first and second abutment surfaces, the abutment member being arranged such that the first abutment surface is in abutment with one end of the first spring means and the second abutment surface is in abutment with one end of the second spring means.

Preferably, the piston member itself is arranged to obscure the outlet opening, rather than any component carried by or otherwise coupled to the piston member.

Preferably, the piston member shaped to cooperate with the outlet opening so as to vary the extent to which the outlet opening is obscured, thereby to provide progressive opening of the outlet opening depending upon the extent to which the piston member is displaced.

Preferably, the piston member is of generally cylindrical form and has a generally cylindrical outer surface which cooperates with the outlet opening to vary the extent to which the outlet opening is obscured, depending on the position of the piston member within the bore.

The diameter of the piston member and the diameter of the bore are preferably selected to ensure movement of the piston member within the bore is guided.

In a preferred embodiment, the piston member is exposed to fuel pressure within an inlet chamber defined by the bore within which the piston moves.

In a further preferred embodiment, the piston member is arranged such that it can completely obscure the outlet opening to prevent fuel flow from the inlet chamber through the outlet opening.

The pressure regulator provides a continuous pressure regulating function as the piston is urged to move against the spring load upon increasing fuel pressure within the inlet chamber.

According to a second aspect of the present invention, a transfer pump for use in supplying fuel to a high pressure pump for an engine comprises a pump outlet through which fuel is supplied at a pressure dependent upon engine speed to the high pressure pump, the transfer pump comprising a pressure regulator as herein described which is arranged to regulate the pressure of fuel delivered by the transfer pump to the high pressure pump, in use.

In a preferred embodiment, the pressure regulator of the transfer pump comprises an inlet region defined by the bore within which the piston member of the pressure regulator moves to vary the extent to which the outlet opening is obscured, the pump outlet being arranged to deliver fuel to the inlet region at a pressure dependent upon the engine speed.

It will be appreciated that the second aspect of the invention may include any one or more of the preferred or optional features of the first aspect of the invention.

According to a further aspect of the present invention, a fuel system for supplying fuel to an engine comprises a transfer pump for delivering fuel at relatively low, regulated pressure to a high pressure fuel pump, the high pressure fuel pump being arranged to deliver fuel to the engine, wherein the fuel system comprises a pressure regulator as herein described which is arranged to regulate the pressure of fuel delivered by the transfer pump to the high pressure pump, in use.

It will be appreciated that the further aspect of the invention may include any one or more of the preferred or optional features of the first aspect of the invention.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
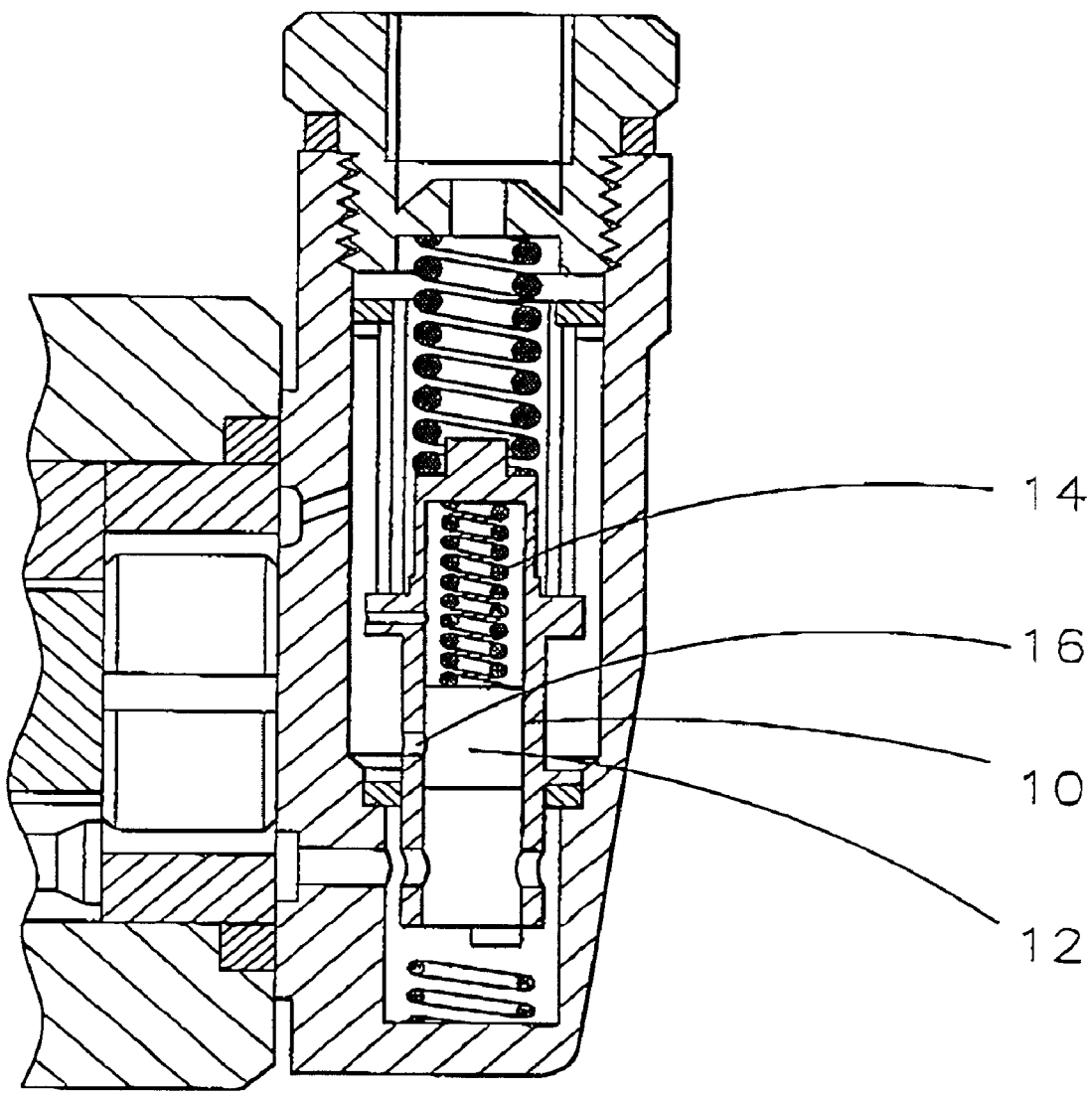
FIG. 1 is a sectional view illustrating part of a fuel pump including a conventional pressure regulator.
Figure 2:
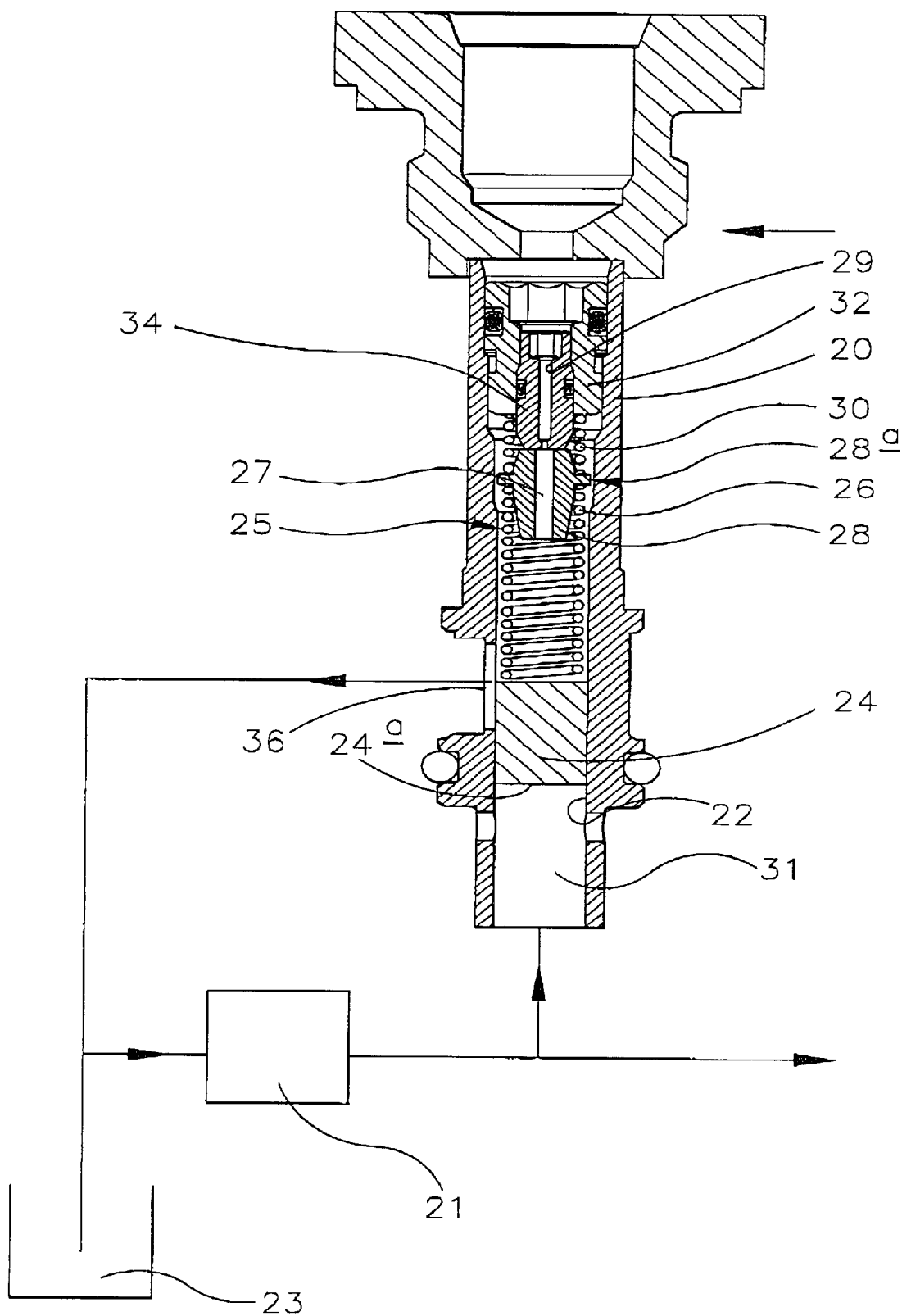
FIG. 2 is a sectional view of a pressure regulator in accordance with an embodiment of the present invention.

FIG. 2 illustrates a pressure regulator for use in regulating the outlet pressure of a transfer pump 21 which is used to supply fuel to an inlet of a high pressure fuel pump (not shown) for supplying fuel to a common rail or a distributed pumping system. The transfer pump 21 is arranged to draw fuel from a fuel reservoir 23 and supplies fuel at a relatively low pressure to the high pressure fuel pump.

The pressure regulator comprises a sleeve or regulator housing 20 provided with a bore 22 within which a piston member 24 is moveable. The piston member 24 is of generally cylindrical form, the diameter of the piston member 24 and the diameter of the bore 22 being selected to ensure movement of the piston member 24 within the bore 22 is guided. The sleeve 20 is provided with an outlet opening 36 positioned such that, depending upon the position of the piston member 24 within the bore 22, the outlet opening 36 is either fully obscured by the cylindrical outer surface of the piston member 24, is partially obscured by the outer surface of the piston member 24 or is fully open. The outlet opening 36 communicates with the fuel reservoir 23 so as to regulate the outlet pressure of the pump 21.

One end of the piston member 24 defines a surface 24a which is exposed to fuel pressure at the outlet of the transfer pump 21 in an inlet region or inlet chamber 31 defined by the bore 22. The pressure of fuel in the inlet region 31 determines the position of the piston member 24 within the bore 22 and, hence, determines the rate of flow of fuel through the outlet opening 36. As fuel pressure within the inlet region 31 increases, the piston member 24 gradually opens the outlet opening 36 depending on fuel pressure within the inlet region 31, as described in further detail below.

The pressure regulator also includes a spring assembly 25 including first and second springs 26, 30, the spring assembly 25 being arranged to apply a biasing force to the piston member 24 which opposes the force due to fuel pressure acting on the piston member 24. The spring assembly 25 also includes an abutment member 28 which is moveable within the bore 22 and is engageable with a first adjustment member 34 in the form of a stop member upon movement of the abutment member 28 beyond a predetermined amount, as will be described in further detail hereinafter. The moveable abutment member 28 includes an annular region 28a and is arranged between the first and second springs 26, 30 such that one end of the first spring 26 is in abutment with a first abutment surface defined by the annular region 28a of the abutment member 28 and one end of the second spring 30 is in abutment with an opposing abutment surface defined by the annular region 28a of the abutment member 28. The end of the second spring 30 remote from the abutment member 28 is in engagement with a further adjustment member 32 provided with a through bore through which the stop 34 extends, the adjustment member 32 being in screw threaded engagement with the sleeve 20 so as to permit the position of the adjustment member 32 relative to the sleeve 20 to be varied. It will be appreciated that the pre-load of the spring assembly 25 can be adjusted by adjusting the position of the adjustment member 32 relative to the sleeve 20. Typically, the stop 34 and the adjustment member 32 take the form of adjustment screws.

The abutment member 28 is provided with a first drilling 27 in communication with a second drilling 29 provided in the stop 34. The provision of the drillings 27, 29 permits the region of the bore 22 within which the first spring 26 is arranged to be vented, thereby preventing the piston member 24 becoming hydraulically locked within the sleeve 20. In addition, as a restricted flow of fuel is permitted through a relatively narrow clearance defined by the piston member 24 and the bore 22, the provision of the drillings 27, 29 allows the effects of viscosity on the operation of the pump to be compensated for ("viscosity compensation"). It will be appreciated that, although a relatively narrow clearance is defined between the piston member 24 and the bore 22, the dimensions of the clearance are such that movement of the piston member 24 within the bore 22 is guided.

In use, prior to engine start up, the abutment member 28 occupies a position in which it is spaced away from the surface 34a of the stop 34, the position of the adjustment member 32 relative to the sleeve 20 being selected so as to provide the desired pre-load of the spring assembly 25. Upon engine start up, as engine speed is increased, fuel pressure at the outlet of the transfer pump 21, and hence fuel pressure in the inlet region 31, is also increased, thereby causing the force applied to the surface 24a of the piston member 24 to be increased. During this first stage of operation, a point will be reached at which the force due to fuel pressure acting on the surface 24a of the piston member 24 is sufficient to overcome the biasing force of the spring assembly 25 such that the piston member 24 is caused to move so as to open, partially, the outlet opening 36. The outlet opening 36 communicates with the fuel reservoir 23 such that fuel pressure at the outlet of the pump 21 is regulated, depending on the extent to which the outlet opening 36 is uncovered by the piston member 24. During this stage of operation, the amount by which the piston member 24 is displaced as fuel pressure within the inlet region 31 increases will be determined by the spring characteristics of the first and second springs 26, 30. As fuel pressure delivered to the inlet region 31 increases, the outlet opening 36 will be opened progressively from a fully obscured state, in which the outer surface of the piston member 24 breaks communication completely (except for minimal fuel leakage) between the inlet region 31 and the outlet opening 36, and a partially obscured state in which the outer surface of the piston member 24 partially obscures the outlet opening 36.

As engine speed increases further, fuel pressure at the outlet of the pump 21 continues to increase. When fuel pressure within the inlet region 31 exceeds a predetermined amount, the abutment member 28 is urged into engagement with the stop 34. Upon engagement between the abutment member 28 and the stop 34, movement of the abutment member 28 is terminated and the second spring 30 becomes disabled such that, for a further increase in fuel pressure within the inlet region 31, only the spring characteristic of the first spring 26 will determine the rate at which displacement of the piston member 24 varies with fuel pressure. It will therefore be appreciated that the rate at which displacement of the piston member 24 varies with fuel pressure depends on whether the abutment member 28 is in engagement with the stop 34. Thus, at higher engine speeds, when fuel pressure at the outlet of the pump 21 is relatively high, the pressure regulator has a different pressure-speed regulating characteristic compared with that at lower engine speeds.

During the second stage of operation when the second spring 30 is disabled, the extent to which the outlet opening 36 is obscured will also vary progressively with increasing fuel pressure within the inlet region 31 from a state in which the outlet opening 36 is partially obscured and a state in which the outlet opening 36 is opened to a maximum extent. It will therefore be appreciated that during both the first stage of operation, when both the first and second spring forces act on the piston member 24, and the second stage of operation, when only the first spring force acts on the piston member 24, the extent to which the outlet opening 36 is uncovered by the piston member 24 will vary progressively as fuel pressure in the inlet region 31 increases, even though the rate of displacement of the piston member 24 with fluid pressure will be different during the first and second stages. The pressure regulator is configured such that, during both the first and second stages of operation, there is an approximately linear relationship between the uncovered flow area presented by the outlet opening 36 and fuel pressure in the inlet region 31.

In order to maintain control of pressure regulation, the characteristics of the first and second springs are preferably selected to ensure that, when fuel pressure within the inlet region 31 reaches a maximum value for the particular pump/engine application and the outlet opening 36 is opened to the maximum extent by the piston member 24 (i.e. the second stage of operation), the piston member 24 is in a position in which the outlet opening 36 is only partially obscured by the outer surface of the piston member 24.

Figure 3:
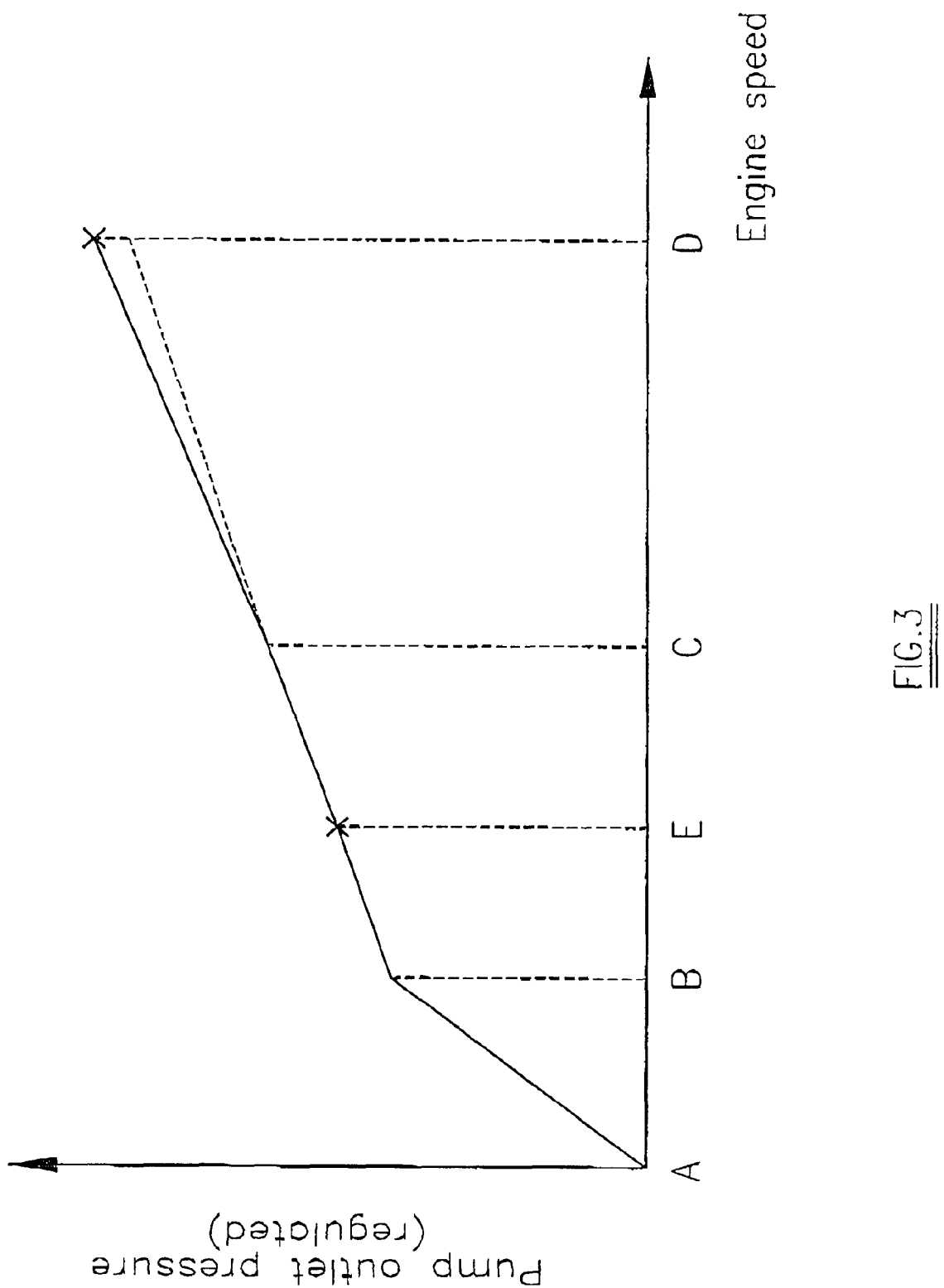
FIG. 3 is a graph to illustrate pressure against engine speed for the pressure regulator shown in FIG. 2 when employed in a fuel pump for use in an engine.

FIG. 3 shows the relationship between the regulated pump outlet pressure (i.e. in the inlet region 31) and engine speed. Upon engine start up (engine speed A) to the point at which the engine reaches engine speed B, the force acting on the surface 24a of the piston member 24 is insufficient to overcome the biasing force due to the spring assembly 25 such that the outlet opening 36 remains closed by the piston member 24. Once the engine reaches engine speed B, the pressure of fuel at the outlet of the pump 21 is increased sufficiently to cause the piston member 24 to move within the bore 22 so as to compress the first and second springs 26, 28, movement of the piston member 24 causing the outlet opening 36 to be partially opened, until the engine speed increases to engine speed C. The rate at which the pump outlet pressure increases with engine speed (i.e. the slope of the pressure-speed characteristic) between engine speeds B and C is governed by the spring characteristics of both the first and second springs 26, 30.

Once the engine speed is increased beyond engine speed C, the force due to fuel at the outlet of the pump acting on the surface 24a of the piston member 24 is sufficient to cause the abutment member 28 to move into engagement with the stop 34, thereby terminating movement of the abutment member 28 and disabling the second spring 30. For engine speeds in excess of engine speed C, the relationship between pump outlet pressure and engine speed is therefore governed only by the spring characteristic of the first spring 26.

It will be appreciated that the engine speed C at which the second spring 30 becomes disabled, and hence the engine speed C at which the slope of the pressure-engine speed characteristic of the pump is altered, is determined by the pre-set, fixed position of the stop 34 within the bore 22. Thus, by adjusting the position of the stop 34 relative to the bore 22 in the sleeve 20 prior to use of the pump, the required fuel pressure at which the second spring 30 becomes disabled can be pre-set to the desired value. The engine speed C at which the pressure-engine speed characteristic changes is therefore selected by adjusting the position of the stop 34 within the bore 22 prior to use of the pump.

The present invention provides the advantage that the pressure-engine speed characteristic of the pump can be adjusted by adjusting the position of the stop 34 and the adjustment member 32, thereby allowing pump to pump variations to be compensated for.

The invention also provides the advantage that the pressure-engine speed characteristic of the pump can be tailored so as to ensure the required transfer pressure is achieved at the two speeds (e.g. speeds D and E in FIG. 3) at which emission levels are measured for the purposes of regulatory approval. For a conventional pressure regulator, the rate of variation of transfer pressure with engine speed is substantially linear and so it is only possible to ensure the desired transfer pressure is achieved at one of the critical emissions speeds.

The present invention is also advantageous in that the adjustable pressure regulator occupies a relatively small volume of space.

What is claimed is:

1. A pressure regulator for use in regulating the outlet pressure of a pump for use in an engine, the pressure regulator comprising a piston member which is moveable within a bore provided in a regulator housing with respect to an outlet opening under the influence of fluid pressure acting on the piston member to control the degree by which the outlet opening is obscured, and a biasing arrangement for applying a biasing force to the piston member which opposes the pressure of fluid acting on the piston member, the biasing arrangement comprising a moveable abutment member which is cooperable with a stop member so as to terminate movement of the abutment member when the abutment member moves into engagement with the stop member and further including an adjustment member for adjusting the pre-load of the biasing arrangement wherein at least a part of the stop member extends through a bore provided in the adjustment member, in use, thereby to vary the rate at which the displacement of the piston member varies with fluid pressure acting on the piston member, the stop member having a pre-set fixed position relative to the regulator housing.

\* \* \* \* \*